(12) United States Patent
Jensen et al.

(10) Patent No.: US 11,204,220 B2
(45) Date of Patent: Dec. 21, 2021

(54) METHOD AND SYSTEM FOR MEASURING AIRBURST MUNITION BURST POINT

(71) Applicant: KONGSBERG DEFENCE & AEROSPACE AS, Kongsberg (NO)

(72) Inventors: Per Inge Jensen, Skjetten (NO); Lars Egil Bjørset, Kongsberg (NO); Dag-Martin Nilland, Kjeller (NO)

(73) Assignee: KONGSBERG DEFENCE & AEROSPACE AS, Kongsberg (NO)

( * ) Notice: Subject to any disclaimer, the term of this patent is extended or adjusted under 35 U.S.C. 154(b) by 0 days.

(21) Appl. No.: 16/961,479

(22) PCT Filed: Jan. 9, 2019

(86) PCT No.: PCT/EP2019/050415
§ 371 (c)(1),
(2) Date: Jul. 10, 2020

(87) PCT Pub. No.: WO2019/158277
PCT Pub. Date: Aug. 22, 2019

(65) Prior Publication Data
US 2021/0088309 A1    Mar. 25, 2021

(30) Foreign Application Priority Data
Feb. 16, 2018  (NO) .................... 20180248

(51) Int. Cl.
*G06G 7/80* (2006.01)
*F41G 3/14* (2006.01)
*G01S 17/18* (2020.01)

(52) U.S. Cl.
CPC .............. *F41G 3/142* (2013.01); *G01S 17/18* (2020.01)

(58) Field of Classification Search
CPC ........ F42C 17/04; F42C 11/065; F42C 19/06; F42C 13/08; F42C 11/002; F41G 3/06; F24B 12/202; F24B 10/26; F24B 12/58
(Continued)

(56) References Cited

U.S. PATENT DOCUMENTS 7,021,187 B1    4/2006 Grassi
9,593,914 B2    3/2017 Muller
(Continued)

FOREIGN PATENT DOCUMENTS

GB         1605302 A       9/1988

OTHER PUBLICATIONS

Modern Firearms, "XM25" https://web.archive.org/web/20171119030123/http://modernfirearms.net:80/en/grenade-launchers/u-s-a-grenade-launchers/xm25-eng/ (cited in the Norwegian Search Report).
(Continued)

*Primary Examiner* — Jamara A Franklin
(74) *Attorney, Agent, or Firm* — Nixon & Vanderhye

(57) ABSTRACT

A method and fire control system for measuring distance to a burst point of airburst munition including: setting a detonation point distance of airburst munition; firing the weapon with airburst munition at time $t_0$; setting a time of flight, $t_1$, of the airburst munitions based on its set detonation point distance, activating and controlling a laser measurement system including a laser transmitter and receiver for sending laser light at a time $t_0+t_1$ and receiving reflected laser light for measuring distance to cloud of smoke resulting from
(Continued)

burst of the airburst munition, processing the reflected laser light and defining a range of distances to the cloud of smoke, and setting a range gate around the set detonation point distance prior to processing received reflected laser light within the range gate for limiting the resulting range of distances and cancelling echoes from surrounding terrain.

20 Claims, 1 Drawing Sheet

(58) Field of Classification Search
USPC .................. 235/404, 411; 102/215, 439, 513
See application file for complete search history.

(56) References Cited

U.S. PATENT DOCUMENTS

| | | |
|---|---|---|
| 2012/0175418 A1 | 7/2012 | Jones |
| 2012/0182541 A1 | 7/2012 | Canham |
| 2012/0233901 A1 | 9/2012 | Kim et al. |
| 2012/0274922 A1 | 11/2012 | Hodge |
| 2012/0325078 A1 | 12/2012 | Shulman et al. |
| 2014/0065578 A1 | 3/2014 | Lee et al. |
| 2014/0251123 A1 | 9/2014 | Venema |
| 2016/0055652 A1* | 2/2016 | Sullivan .................. F42C 17/00 235/404 |
| 2017/0097216 A1* | 4/2017 | Sullivan .................. F42B 10/32 |

OTHER PUBLICATIONS

Modern Firearms, "Norinco LG5 QLU-11" https://web.archive.org/web/20171106015751/https://modernfirearms.net/en/grenade-launchers/china-grenade-launchers/norinco-lg5-qlu-11-eng/ (cited in the Norwegian Search Report).
Wikipedia "S&T Daewoo K11" https://web.archive.org/web/20170227085505/https://en.wikipedia.org/wiki/S%26T_Daewoo_K11(cited in the Norwegian Search Report).
Wikipedia, "Papop" https://web.archive.org/web/20170311210323/https://en.wikipedia.org/wiki/PAPOP (cited in the Norwegian Search Report).
International Search Report, dated Oct. 4, 2019, from corresponding PCT application No. PCT/EP2019/050415.
Norwegian Search Report, dated Sep. 15, 2018, from corresponding Norwegian patent application No. 20180248.
Written Opinion, dated Oct. 4, 2019, from corresponding PCT application No. PCT/EP2019/050415.

* cited by examiner

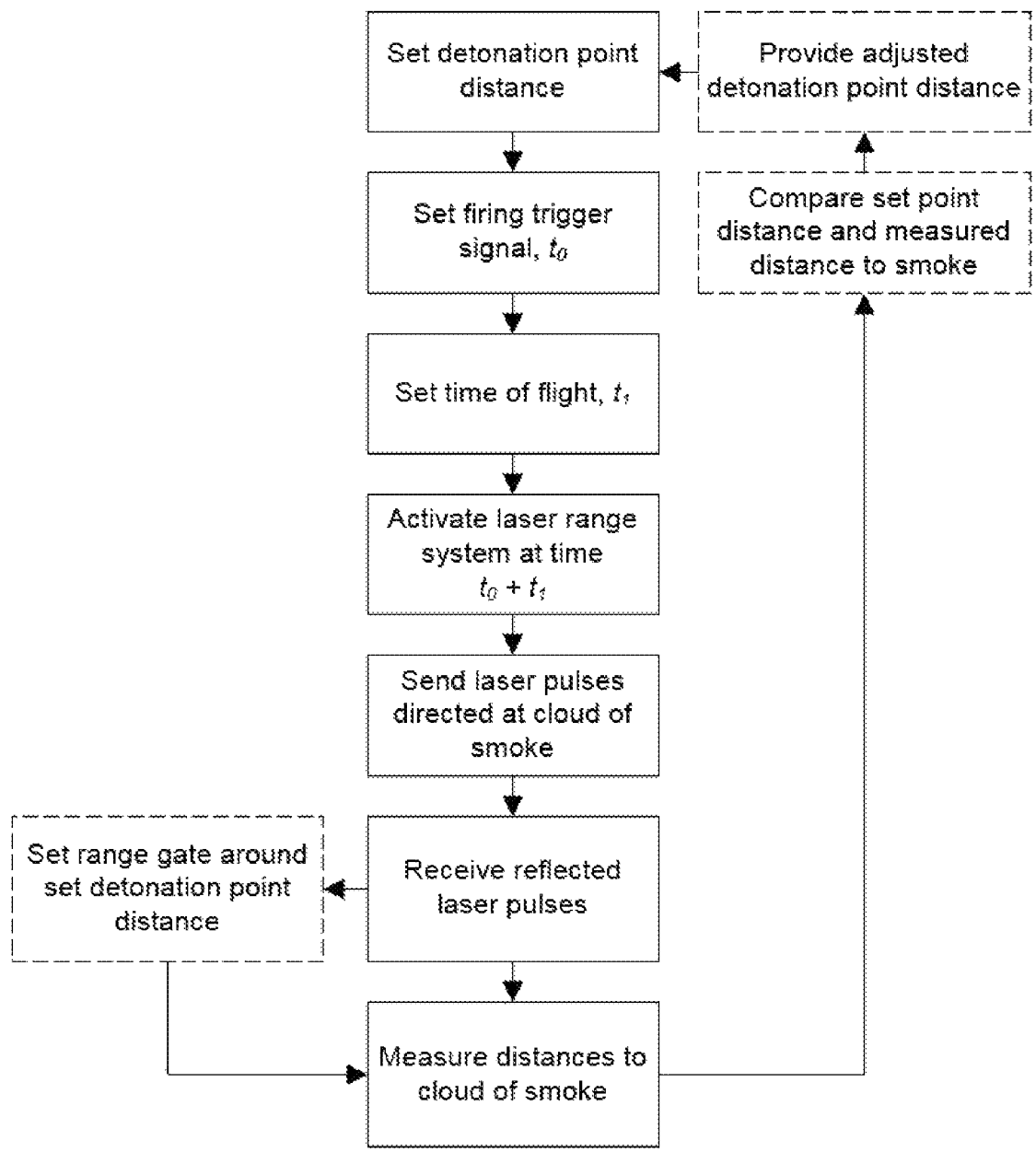

METHOD AND SYSTEM FOR MEASURING AIRBURST MUNITION BURST POINT

The present invention concerns a fire control system for a weapon firing explosive projectiles, and more specifically to a fire control method and system measuring possible deviation from a pre-planned position of a burst point of airburst munitions.

BACKGROUND AND PRIOR ART

For maximum effect on a target, accurate positioning of the airburst detonation point in space is critical. To control the distance to the airburst munition to detonate, most airburst munitions use a technology where the time of flight to a given burst point is programmed into the round. Some systems use an exit velocity ($V_0$) sensor for better prediction of the time of flight, and the munition can then be programmed in flight. There are however several factors influencing deviations from an expected burst point. Examples of such are head/tail/side winds, air density/pressure and propellant temperature as well as temperature in the barrel of the weapon being used.

One type of airburst munition comprises a turn count sensor where a given number of turns defines a given distance relatively independent of the exit velocity of the projectile. The number of turns for a projectile will give a specific range, i.e. distance from a weapon to a burst point. A fixed number of turns, corresponds to a defined displacement.

This technology reduces the effect of $V_0$ variation, but other factors can still contribute to errors in the range. An example of this is that variation of the rifling angle of each individual gun will have an impact on the range to the burst point.

Most modern weapon-stations use a laser range finder to determine the range to the target. For ground targets, it is often desirable to have the burst point of the detonation above or in front of the target. The laser is normally mounted coaxial to the sight of the weapon station for pointing at the target, and not at the predicted burst point of the ammunition. Some fire control systems fire airburst ammunitions in a predefined pattern, while the sight remains stationary at the centre of the target.

U.S. Pat. No. 9,593,914 B2 describes a method and fire-control system for acquiring the coordinates of a trigger point of a projectile above a field part on which a target is located. The method is based on emission of at least one laser pulse having a pre-determined duration and directed towards the target. Images reflected is received with a receiver equipped for the synchronous visualization of the laser pulses originating from a piece of observation of the field part. Recovery of the coordinates of a desired trigger point when the operator has chosen a location after the piece of observation was moved.

This solution depends on a receiver with means for synchronous visualization of reflection of laser pulses under the form of a piece of observation of the field part having a width adjustable by selecting a duration for the laser emission or reception, and the distance of the piece of observation with respect to the receiver is adjustable by adjusting a delay between the emission and the reception. A camera is mentioned as the receiver for receiving images of reflections of emitted laser pulses from a target, and where its shutter is synchronised with emission of the laser pulse.

This method and system require a relatively complex set-up and modification of existing equipment.

There is a need for a simple method and system for measuring position of airburst munitions burst point thereby enabling automatically correction of the fire control system in case of deviation from pre-planned burst point.

The present invention describes a solution according to this where one example of implementation is using a laser range finder already comprised in a weapon system.

A new approach for determining the actual burst point of airburst munitions is suggested. According to the method and system, existing equipment can be used without need for modifications or additional equipment, and where the burst point is measured with high accuracy.

SHORT DESCRIPTION OF THE INVENTION

The present invention is defined by a method for measuring a burst point of airburst munition. The method comprises the following steps:
- setting a detonation point distance of the airburst munition;
- firing a weapon with airburst munition at time $t_0$;
- setting a time of flight, $t_1$, of the airburst munitions based on its set detonation point distance;
- activating and controlling a laser measurement system comprising a laser transmitter and receiver for sending laser light at a time $t_0+t_1$ and receiving reflected laser light for measuring distance to cloud of smoke resulting from burst of the airburst munition;
- processing the reflected laser light and defining a range of distances to the cloud of smoke, and
- setting a range gate around the set detonation point distance prior to processing received reflected laser light within the range gate for limiting the resulting range of distances and cancelling echoes from surrounding terrain.

Further features of the method are defined in the claims.

The invention further comprises a computer program performing said method when executed on a computer, thereby causing a distance to a burst point of airburst munition to be measured.

The invention is further defined by a fire control system for measuring the distance to a burst point of airburst munition. The system comprises:
- firing means for firing a weapon with airburst munition at time $t_0$;
- setting means for setting a time of flight $t_1$, of the airburst munitions based on a set detonation point distance;
- activation and controller means for activating and controlling a laser measurement system comprising a laser transmitter and receiver for sending laser pulses at a time $t_0+t_1$, and receiving reflected laser light for measuring distance to cloud of smoke resulting from the burst of the airburst munition;
- processor for processing the reflected laser light and defining a range of distances to the cloud of smoke;
- range setting and processing means for setting a range gate around the set detonation point distance prior to processing received reflected laser light within the range gate for limiting the resulting range of distances and cancelling echoes from surrounding terrain.

The system further comprise means adapted for performing the method defined in the claims as well as a computer program having instructions that when executed in a processor of a computing device or system performs the method.

BRIEF DESCRIPTION OF THE DRAWING

FIG. 1 shows the different steps involved in a method for measuring the distance to a burst point of airburst munition.

DETAILED DESCRIPTION OF THE INVENTION

In the following description, different features of the invention will be described with reference to FIG. 1.

As mentioned, accurate prediction, estimation and measurement of the position of an airburst point is critical.

The invention comprises a method, system and computer program for determining the actual distance to the burst point of airburst munition.

The method is defined by several steps as shown in FIG. 1. The first step is setting a detonation point distance of airburst munition. This can be done in several ways.

One way is to manually set the detonation point distance based on a known distance. This is a typical scenario when a weapon in tested and calibrated. A distance of 280 meters is set when a known target is located at this distance.

If a distance to a target is unknown, the distance can be measured by using integrated distance measuring means being part of a weapon or weapon system. This may for instance be a laser range finder. By using integrated means, a measured distance to a target can be automatically set and programmed into airburst munition ready for being fired.

Another way of determining a distance from a weapon to a target is to use external means not being part of a weapon or weapon system. An example of this are binoculars with integrated laser range finder. In this case, a measured distance to a target must be manually set on the weapon or airburst munition.

Detonation of airburst munition can be triggered in different ways. Examples are: time fuse, $V_0$ fuse and turns count fuse.

As mentioned, the set detonation point distance can be found by means of a laser range finder. However, other means for determining distance are feasible.

After setting the distance to the detonation point of the airburst munition, the next step is firing a weapon with the airburst munition at time $t_0$.

Another step is setting time of flight, $t_1$, of the airburst munitions based on its set detonation point distance from the weapon. This step and the step of firing a weapon can be performed in any order.

Determining time of flight for airburst munition and projectiles is well known. This is normally performed by using a range table or an algorithm taking different variables into account and adjusting parameters related to projectile ballistics which is influenced by wind directions, air pressure and humidity, among others.

The next step of the method is activating and controlling a laser range measurement system comprising a laser transmitter and receiver for sending laser light at a time $t_0+t_1$ and receiving reflected laser light for measuring distance to a cloud of smoke resulting from burst of the airburst munition.

Smoke, also called aerosols, can be a colloid of fine solid particles or liquid droplets in air or another gas. In addition to smoke resulting from burst of munition, examples of natural aerosols are fog, dust, forest exudates and geyser steam.

In one embodiment of the invention, transmitted and received laser light is laser light pulses.

One type of laser range finder using laser light pulses measures range by transmitting thousands of single pulses per second. More pulses give better accuracy in measurements but will result in longer measurement times. A laser beam is designed to have a small beam of typically 1 mrad. It is thus essential that the beam is pointed into the cloud of smoke when measurements are performed.

A smoke cloud resulting from burst of ammunition normally appears only for a very short time. It further has low reflectivity. It is therefore essential that the laser sends its light pulses at the right time to get a measurement.

In one embodiment of the invention, timing of sending laser pulses and number of pulses to send is controlled based on said time, $t_0$, when the weapon is fired and the time of flight, i.e. $t_0+t_1$. Based on time of flight prior to detonation of burst munition, the timing and number of pulses sent shall be such that a maximum number of pulses will hit the cloud generated by the burst during the life-time of the cloud.

By setting the trigger signal when firing the weapon at time $t_0$, and knowing the time of flight, $t_1$, of the burst munition based on distance to target, the laser can be activated at the best possible time, to ensure that the cloud of smoke is present during the laser measurement.

In one embodiment of the invention, the fire control system can automatically orient the laser range finder to the predicted burst point. The laser measurement system can then be controlled to send laser pulses in the direction of the burst point and where ballistics of the munition used is accounted for.

Reflected laser pulses are received and processed for defining a range of distances to the cloud of smoke resulting from burst of the airburst munition. This range of distances may also comprise distances to objects and surrounding terrain not being part of the cloud of smoke.

For including only relevant range measurements, the resulting range of distances can, in a preferred embodiment of the invention, be limited by setting a range gate around the set detonation point distance prior to processing received reflected laser pulses thereby cancelling measurements due to echoes from other objects than the cloud of smoke.

A final distance to a burst point can be determined by averaging the distance measurements within the range gate or using different statistical processing methods.

A range gate also works as a filter automatically filtering out possible disturbances that may occur between the sensors and the burst, thus reducing likelihood of incorrect measurement data. Within the set range gate, an increased sensitivity can be applied such that low signals normally rejected as noise can be used as basis for range measurement.

In order to further increase likelihood of detecting airburst detonation point, a reference measurement can be performed prior to firing, in order to define a noise floor within the range gate that can be used to correlate with the actual burst measurement.

The range gate sensitivity can be adjusted pending on the pre-firing (noise floor) measurement.

Said method is very useful for adjusting subsequent firing of airburst munition according to deviations found in set detonation point distance and the measured distance to cloud of smoke resulting from burst of the airburst munition, as shown in FIG. 1. By comparing the coordinates of a set detonation point and the coordinates of a cloud point a set detonation point, subsequent firing of airburst munition can be adjusted according by setting a new adjusted set detonation point distance. The method can be repeated for each shot when shooting a series of shots. By providing.

Based on said method, a fire control system can automatically calculate deviations from a pre-planned detonation point to an actual measured burst point. For subsequent firing, the range to detonation of ammunition can be corrected, e.g. by adjusting the number-of-turns-to-detonation in a turn count sensor and the projectile ballistics will be updated accordingly.

The inventive method can be performed by a fire control system controlling a laser range finder comprised in a weapon, and where same laser range finder is used for both measuring the detonation point distance to target and distances to cloud of smoke.

The invention is also defined by a fire control system for measuring a distance to a burst point of airburst munition. The system comprises firing means for firing a weapon with airburst munition at time $t_0$ and means for registering the time $t_0$. It further comprises means for setting a time of flight $t_1$, of the airburst munitions based on a set detonation point distance.

The fire control system further comprises activation and controller means for activating and controlling a laser measurement system. The laser measurement system comprises a laser beam device for sending and receiving laser pulses at a time corresponding to $t_0+t_1$. The system further comprises means for measuring distances to cloud of smoke resulting from the burst of the airburst munition.

An example of a system where the inventive method can be implemented is a remote weapon station (RWS). This already comprises all means necessary for implementing the method for controlling the RWS according to the invention, i.e. weapon for shooting airburst munition, laser range finder, control systems for controlling aiming of laser range finder and aiming at a detonation point, and controller for activating a trigger firing the weapon. It is thus not necessary to modify an existing weapon system other than installing a computer program.

The method according to the invention described above can be implemented in a computer program having instructions that when executed cause a computing device or system to perform the method. The computing device can be the fire control system connected to said RWS system.

There are several benefits of the invention. An operator can receive information of exact position of a burst point of airburst munition and can adjust a set detonation point for a subsequent shot. The method can be implemented in existing equipment without need for modifications or additional equipment.

The invention claimed is:

1. A method for measuring the distance to a burst point of airburst munition, comprising the following steps:
    setting a detonation point distance of the airburst munition;
    firing a weapon with airburst munition at time $t_0$;
    setting a time of flight, $t_1$, of the airburst munition based on a set detonation point distance of the airburst munition,
    activating and controlling a laser measurement system comprising a laser transmitter and receiver for sending laser light at a time $t_0+t_1$ and receiving reflected laser light for measuring distance to a cloud of smoke resulting from burst of the airburst munition,
    processing the reflected laser light and defining a range of distances to the cloud of smoke,
    setting a range gate around the set detonation point distance prior to processing received reflected laser light within the range gate for limiting the resulting range of distances and cancelling echoes from surrounding terrain.

2. The method according to claim 1, wherein the set detonation point distance is found by means of a laser range finder.

3. The method according to claim 2, wherein the controlling of the laser measurement system comprises orienting and directing the laser beam at the cloud of smoke.

4. The method according to claim 3, further comprising accounting for ballistics of the munition used when sending the laser light in the direction of the burst point.

5. The method according to claim 3, further comprising comparing the set detonation point distance and the measured distance to the cloud of smoke and adjusting the set detonation point for subsequent firing of airburst munition according to deviations.

6. The method according to claim 2, further comprising accounting for ballistics of the munition used when sending the laser light in the direction of the burst point.

7. The method according to claim 2, further comprising comparing the set detonation point distance and the measured distance to the cloud of smoke and adjusting the set detonation point for subsequent firing of airburst munition according to deviations.

8. The method according to claim 1, wherein the controlling of the laser measurement system comprises orienting and directing the laser beam at the cloud of smoke.

9. The method according to claim 8, further comprising accounting for ballistics of the munition used when sending the laser light in the direction of the burst point.

10. The method according to claim 8, further comprising comparing the set detonation point distance and the measured distance to the cloud of smoke and adjusting the set detonation point for subsequent firing of airburst munition according to deviations.

11. The method according to claim 1, further comprising accounting for ballistics of the munition used when sending the laser light in the direction of the burst point.

12. The method according to claim 11, further comprising comparing the set detonation point distance and the measured distance to the cloud of smoke and adjusting the set detonation point for subsequent firing of airburst munition according to deviations.

13. The method according to claim 1, further comprising comparing the set detonation point distance and the measured distance to the cloud of smoke and adjusting the set detonation point for subsequent firing of airburst munition according to deviations.

14. The method according to claim 1, further comprising using same laser range finder for both measuring the detonation point distance to target and distances to the cloud of smoke.

15. The method according to claim 1, further comprising transmitting and receiving the laser light as laser pulses.

16. The method according to claim 15, further comprising controlling number of laser pulses to send, as well as when to send the pulses based on the time $t_0+t_1$.

17. The method according to claim 1, further comprising performing a pre-firing reference measurement prior to firing, in order to define a noise floor within the range gate used for correlating with the actual burst measurement.

18. The method according to claim 17, further comprising adjusting the range gate sensitivity pending on the pre-firing measurement.

19. A fire control system for measuring the distance to a burst point of airburst munition, comprising:
  firing means for firing a weapon with airburst munition at time $t_0$;
  setting means for setting a time of flight $t_1$, of the airburst munitions based on a set detonation point distance;
  activation and controller means for activating and controlling a laser measurement system comprising a laser transmitter and receiver for sending laser pulses at a time $t_0+t_1$, and receiving reflected laser light for measuring distance to cloud of smoke resulting from the burst of the airburst munition;
  processor for processing the reflected laser light and defining a range of distances to the cloud of smoke; and
  range setting and processing means for setting a range gate around the set detonation point distance prior to processing received reflected laser light within the range gate for limiting the resulting range of distances and cancelling echoes from surrounding terrain.

20. A non-transitory computer-readable medium on which is stored a computer program that, when executed by a processor of a computing device or system, implements a method that performs the following steps:
  setting a detonation point distance of the airburst munition;
  firing a weapon with airburst munition at time to;
  setting a time of flight, $t_1$, of the airburst munition based on a set detonation point distance of the airburst munition,
  activating and controlling a laser measurement system comprising a laser transmitter and receiver for sending laser light at a time $t_0+t_1$ and receiving reflected laser light for measuring distance to a cloud of smoke resulting from burst of the airburst munition,
  processing the reflected laser light and defining a range of distances to the cloud of smoke, and
  setting a range gate around the set detonation point distance prior to processing received reflected laser light within the range gate for limiting the resulting range of distances and cancelling echoes from surrounding terrain.

* * * * *